United States Patent
Khanna

(10) Patent No.: US 6,550,006 B1
(45) Date of Patent: Apr. 15, 2003

(54) METHOD AND APPARATUS TO PERFORM A REMOTE BOOT

(75) Inventor: Rahul Khanna, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/359,948

(22) Filed: Jul. 22, 1999

(51) Int. Cl.$^7$ ............................................. G06F 9/445
(52) U.S. Cl. ......................................................... 713/2
(58) Field of Search .............................. 713/2; 709/220, 709/222

(56) References Cited

U.S. PATENT DOCUMENTS 6,282,642 B1 * 8/2001 Cromer et al. .................. 713/2
6,292,890 B1 * 9/2001 Crisan ............................ 713/2
6,314,455 B1 * 11/2001 Cromer et al. .............. 709/217

* cited by examiner

*Primary Examiner*—Thomas M. Heckler
(74) *Attorney, Agent, or Firm*—Blakely, Sokoloff, Taylor & Zafman LLP

(57) ABSTRACT

A method comprises reading a remote boot signal and a program type signal from a memory of a computer system. The remote boot signal and program type signal are written by way of an external channel. A program identified by the program type signal is booted.

18 Claims, 2 Drawing Sheets

METHOD AND APPARATUS TO PERFORM A REMOTE BOOT

BACKGROUND

1. Field

The invention relates to the field of booting computer systems and, more particularly, to booting computer systems remotely.

2. Background Information

Booting is the process of placing a computer system under the control of a software program. A computer system, as defined herein, is any device with a processor capable of executing instructions. For example, personal computers, desktop computers, server computers, hand-held computers and information appliances are all examples of computer systems as defined herein.

Often, the software program to boot comprises an operating system. One function of an operating system may be to manage various resources of the computer system, such as memory and interrupts. The booted program need not be an operating system. For example, the program could be a sequence of instructions whose primary purpose is to provide diagnostics of various components of the computer system, such as the processor and hard disks, for example.

Booting may be typically accomplished by either powering on the computer system, or resetting the computer system to an initial state. A power-on self test (POST) may then be performed to diagnose and initialize resources, such a s random access memory (RAM), before transferring control to the computer system's basic input/output system (BIOS). The program to boot may be read by the BIOS from a location in nonvolatile memory (such as a hard disk) into RAM. This is called "loading" the program. Once the program is loaded, control may be transferred to the program by jumping to an initial instruction within the program. From this initial instruction, the program may begin executing on the processor.

Multiple programs may be made available for booting. For example, a comput er system may comprise multiple hard disks. Each hard disk may comprise multiple, logical areas known as partitions. Each partition may comprise a program to boot and an area known as a master boo t record (MBR). The MBR may contain signals in the form of bits which the BIOS may apply to determine how to load and transfer control to the program to boot.

It may be desirable to perform remote booting of the computer system. Remote booting typically involves exchanging signals with the computer system over an external communications channel in order to initiate the booting of a program by the computer system. The external channel may be embodied in numerous ways. For example, the external channel may comprise a coupling to a local area network, or to the Internet. The external channel may comprise a coupling to the public telephone network using a data modem, or a coupling to a cable television network using a cable modem. Alternatively, the external channel may comprise a coupling to a satellite system by way of a satellite transceiver. These are only some of the many possibilities for an external channel. The signals to initiate booting may be transmitted over the external channel by a remote device. The remote device may comprise another computer system or a dumb terminal, among many possibilities.

As the complexity of computer systems increases, it becomes increasingly desirable to boot computer systems remotely in order, for example, to place a diagnostic to program in control of the system for purposes of remote troubleshooting.

SUMMARY

In accordance with one aspect of the present invention, a remote boot signal and a program type signal are read from a memory of a computer system where they were written by way of an external channel. A program identified by the program type signal is booted.

BRIEF DESCRIPTION OF THE DRAWINGS

The subject matter regarded as the invention is particularly pointed out and distinctly claimed in the concluding portion of the specification. The invention, however, may be further understood by reference to the following detailed description when read with reference to the accompanying drawings.

DETAILED DESCRIPTION

The embodiments described herein are merely illustrative, and one skilled in the art will appreciate that numerous modifications can be made which nonetheless fall within the scope of the present invention.

Certain embodiments of modem computer systems may be configured to boot a program located on the "active partition" of the "default disk". The default disk, in some embodiments, may comprise a hard disk comprising the program to boot. The active partition is the partition on the default disk comprising the program to boot. Specifying the default disk and active partition to the BIOS may involve the specification of disk and partition identifiers which are only known to persons with expert knowledge of the computer system.

For example, the hard disks in a computer system may be assigned ordinal numbers according to hardware jumpers set by the manufacturer of the disk or computer system. The partitions on these disks may be identified using numbers which are typically unknown to the average user of the computer system. A person or device attempting to boot the computer system remotely would typically have no knowledge of these disk and partition identifiers.

One embodiment of the present invention provides for remote booting of the computer system without the device operating to perform the remote boot being called on to specify disk or partition identifiers. Instead, in this embodiment, the device operating to remotely boot the computer system may specify a type of program to boot.

Figure 1:
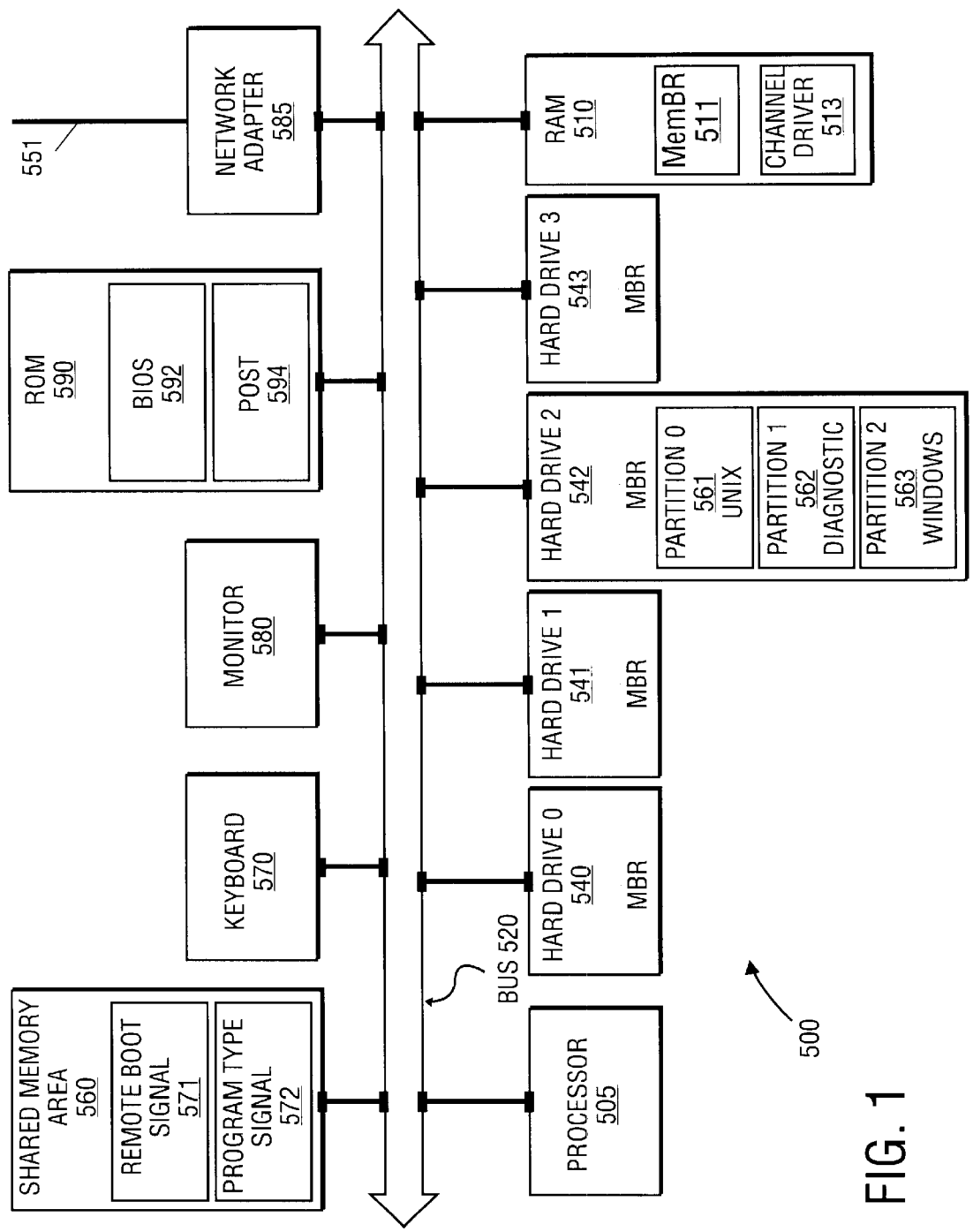
FIG. 1 is a block diagram illustrating a computer system embodiment in accordance with the present invention.

FIG. 1 shows an embodiment of a computer system in accordance with the present invention. Embodiment 500 comprises a processor 505 to execute instructions supplied from a bus 520. The executed instructions are stored in a random access memory 510 (RAM) from which they are supplied to the processor 505 by the bus 520 for execution. The processor 505 may be implemented using any semiconductor fabrication technology and may execute any instruction set including, but not limited to, instruction sets supported by an Intel Corporation Pentium® processor or compatible processor. The bus 520 may be implemented using technologies for propagating signals including, but not limited to, electronic and optical conductors. Those skilled in the art will appreciate that bus 520 may in fact comprise multiple segments with bus bridge interconnects. Embodiment 500 may include multiple machine-readable storage mediums 540, 541, 542, and 543 to store one or more programs to be loaded into RAM 510. In one embodiment, the machine-readable mediums comprise hard disks. However, the machine-readable storage mediums 540, 541, 542, and 543 may also comprise a floppy disk, a CD-ROM or other optical disk, a read-only memory, or any other memory for storing instruction sequences.

To perform signal input/output, embodiment 500 may comprise a keyboard 570 and a display 580, each coupled to the bus 520 for transmitting data so that it may be easily accessed or manipulated by a user. Of course, other peripheral devices may be comprised by the system as well. The embodiment 500 may further include a network adapter 585 to couple the embodiment 500 to a network cable 551. Of course, the invention is not limited in scope to this particular embodiment.

In the following discussion, reference is frequently made to hard disks. Those skilled in the art will appreciate that other memory technologies may be employed in place of hard disks which nonetheless fall within the scope of the present invention.

Embodiment 500 distinguishes each of the four hard disks 540–543 from one another using an identification number for each disk. In the illustrated embodiment the disk identification numbers are zero, one, two and three. In this embodiment, a fifth hard disk added to the system would be assigned an identification number of four. Disk two is shown having three logical partitions. Of course, other embodiments may assign disk identifiers according to different rules. Each logical partition of each disk is assigned an identification number which may be any unique value. For a particular disk, the partition identification should uniquely identify each partition. In one embodiment, partition zero 561 on disk two 542 stores a first operating system to boot, the Unix™ operating system. Partition one 562 stores a diagnostic program to boot. Partition two 563 stores a second operating system to boot, the Microsoft™ Windows™ operating system. Of course, this is only one possible embodiment. The invention is in no way limited to a particular number of hard disks, partitions per disk, or the placement of programs to boot in any particular disk or partition. Nor is the invention limited to any particular program or operating system to boot.

In one embodiment, POST instructions 594 and BIOS instructions 592 may be stored in a read-only memory 590 (ROM) from which they may be executed by processor 505. Of course, the invention is not limited to POST 594 and BIOS 592 stored in a ROM 590. Other types of memory may be employed for storage of these instructions as well.

In this embodiment, each disk comprises a master boot record (MBR) comprising information about the number and size of partitions on the disk and identifying an active partition on the disk. BIOS 592 may, in one embodiment, be configured to boot the program stored within the active partition of the disk identified as the default disk. In one embodiment the default disk is disk zero 540. In other words, in one embodiment, the BIOS 592 always boots the program in the active partition of disk zero 540.

When determining which program to boot, BIOS 592 may reference a memory boot record 511 (herein abbreviated as MemBR) stored in RAM 510. Of course, MemBR 511 could be stored using other read/write memory technologies as well. The MemBR 511 may be generated by POST instructions 594 which, in one embodiment, executes prior to BIOS 592, during the initialization sequence of computer system 500. The MemBR 511 may comprise signals from each MBR of each disk in the system. These signals may comprise disk identification numbers and an identification of the active partition for each disk. The MemBR 511 may, of course, comprise additional signals, such as an input/output (I/O) address for sending and receiving signals to and from each disk, for example.

The MBR for each disk may identify the number and size of each partition on the disk. The MBR may further identify a partition type for each partition. The partition type identifies the boot program stored within the partition. For example, a partition storing a Unix® operating system may be assigned a different partition type than a partition storing a Microsoft® Windows® operating system or a partition storing a diagnostic program.

In one embodiment the computer system embodiment 500 comprises a shared memory 560 which may be accessed by both the POST instructions 594 and a remote device by way of the external channel. The memory is referred to as "shared" because it is accessible by both the computer system and the remote device. In embodiment 500, the external channel may comprise network adapter 585 and network cable 551. Shared memory 560 may comprise any read/write memory technology including RAM or flash memory, among numerous possibilities. Two signals may be stored within the shared memory area 560. The remote boot signal 571 identifies whether the computer system should perform a remote boot. When the remote boot signal 571 has a predetermined value (for example, "1") a remote boot should be performed; otherwise, a remote boot should not be performed. The program type signal 572 may comprise a program type to boot. Both signals may be written to the shared memory 560 by a remote device via the external channel. Of course, other embodiments may comprise other external channel implementations, and the shared memory 560 may store additional signals to those illustrated.

The signals may be written to the shared memory area 560 in numerous manners each well known in the art. For example, a channel driver 513 stored in RAM 510 may have the capability to transfer signals from external channel to shared memory 560. In one embodiment, signals written to shared memory 560 have no effect on system operation until the system is next booted.

Figure 2:
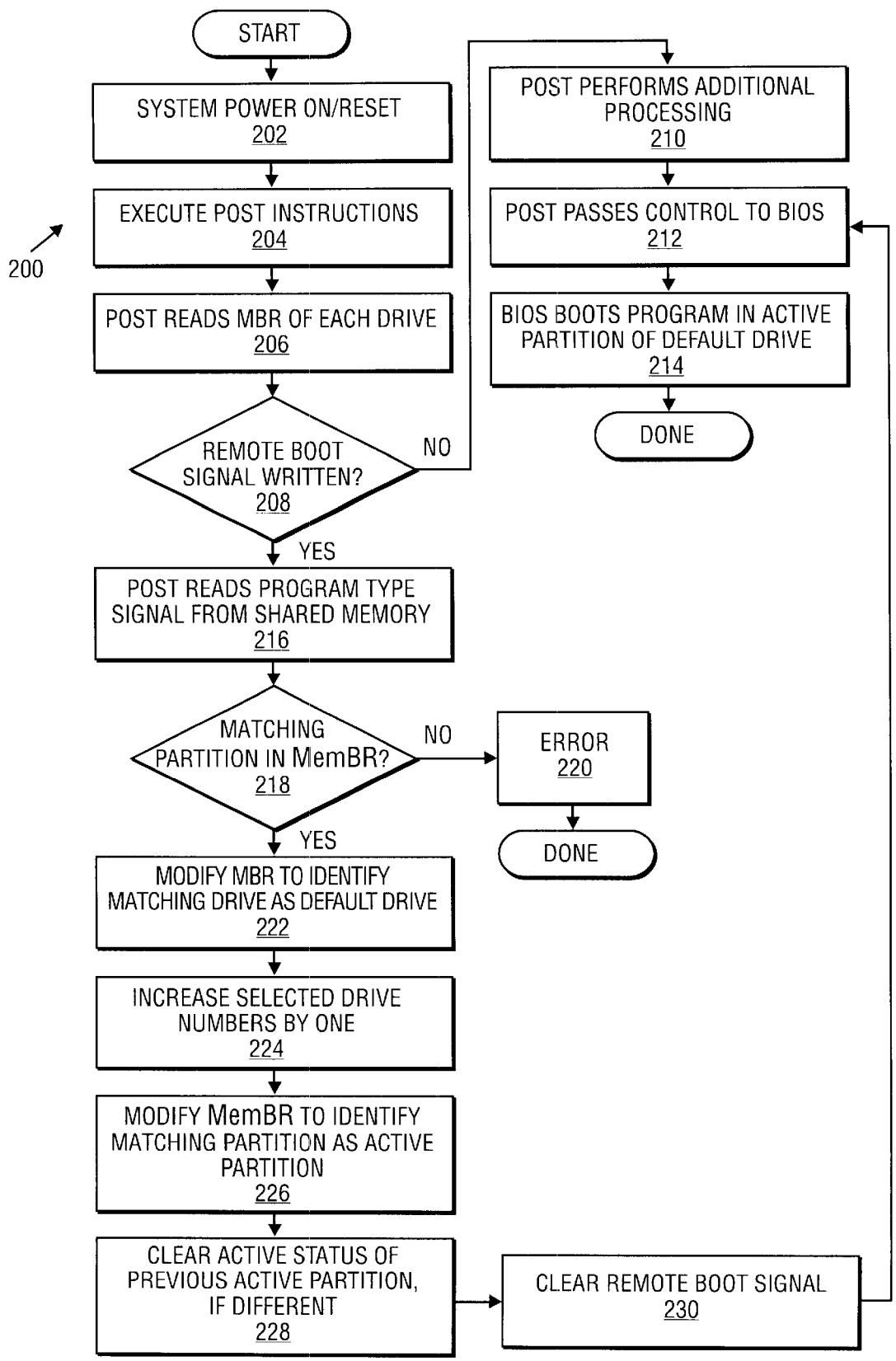
FIG. 2 is a flow chart illustrating a method embodiment in accordance with the present invention.

FIG. 2 shows a method embodiment 200 in accordance with the present invention. At 202 a computer is powered on or reset. This results in the computer system being reset to an initial state. POST instructions may then be executed by the processor at 204. POST instructions may read the MBR of each hard disk comprised by the computer system to generate the MemBR at 206. At 208, POST instructions may read from or otherwise examine the shared memory area to determine whether the remote boot signal has been written. If the remote boot signal has not been written with a predetermined value (for example "1", although any predetermined value may be employed), POST may perform additional processing at 210 before passing control to BIOS at 212. At 214, BIOS may boot the program identified in the active partition of the default disk (disk zero). Because the remote boot signal was not written with the predetermined value, the booted program may be that program which the computer system is configured to boot by default when the computer system is powered on or reset.

If the remote boot signal has been written with the predetermined value, POST instructions may read the program type signal from the shared memory area at 216. The program type signal identifies a type of program to boot. Typically, there will be only one program matching such type stored on one disk of the computer system, because there is little need on most computer systems for multiple copies of the same operating system or other program to boot. POST instructions scan the MemBR for the first partition containing a program matching the program type at 218. If a partition containing a matching boot program is not located, an error condition is generated at 220. If a matching partition is located, POST instructions may make certain modifications to the MemBR. At 222, the MemBR may be modified such that the disk containing the matching program is identified as the default disk for BIOS to boot from. In one embodiment, as previously described, the default disk is that disk with disk identification zero. Thus POST instructions may change the identification of the disk with the matching program to zero. At 224, the identifications of all disks with identifications greater than or equal to zero but less than the (unchanged) identification of the matching disk may be increased by one. For example, if disk two contains a program matching the type identified by the partition type signal in shared memory, the following changes may be made to the MemBR: disk zero may be changed to disk one, disk one may be changed to disk two, and disk two may be changed to disk zero. Disk three is unchanged.

If the matching partition is not the active partition of the disk, POST instructions may alter the MemBR to identify the matching partition as the active partition at 226. If another partition of the disk was the active partition, its active status is cleared in the MemBR at 228.

When BIOS receives control from the POST instructions, it may read from the MemBR to determine which program to boot. The program comprised by the active partition of the default disk may be selected as the program to boot. In accordance with this embodiment of the present invention, this program may be the program identified by type in the shared memory area when the remote boot signal is written.

Before passing control to the BIOS, the POST instructions may at 230 clear the remote boot signal from the shared memory. This way, the computer system will not read the program type in the shared memory area to determine which program to boot when the computer system is booted again.

A device operating to boot the computer system remotely may specify the program to boot using a program type identification. In order to specify a program to boot, the person or device operating to boot remotely need not know detailed information about the computer system such as the number of disks, disk identifiers, and partitions identifiers. The device booting remotely may write a remote boot signal and a program type signal to the shared memory area of the computer system using the external channel. This will result in the computer system booting the program specified by type in the shared memory area.

One application in accordance with the present invention involves remote diagnostics of the computer system by a service technician. A user of the computer system may call a service center to report a problem with computer system operation. A technician may employ an external channel comprising a modem and the public telephone network to create a dial-up connection to the computer system, in a manner well known in the art. The remote technician may use a terminal or other device to signal the computer system to set the remote boot flag and a program type in the shared memory area. The program type may identify a diagnostic program on one hard disk of the computer system. Instead of booting an operating system to execute application programs such as Windows® or Unix® (which the computer system may do by default on power up or reset), the computer system may boot the diagnostic program to enable the technician to remotely diagnose errors in operation.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:

reading a remote boot signal and a program type signal from a memory of a computer system, the remote boot signal and program type signal written by way of an external channel; and booting a program identified by the program type signal.

2. The method of claim 1 in which the program is booted when the remote boot signal has a predetermined value.

3. The method of claim 1 in which booting the program further comprises:

locating a hard disk comprising the program.

4. The method of claim 3 further comprising:

locating a partition on the hard disk comprising the program.

5. The method of claim 3 further comprising:

identifying the hard disk as a default disk.

6. The method of claim 4 further comprising:

identifying the partition as an active partition of the hard disk.

7. An article comprising:

a machine-readable medium having stored thereon sequences of instructions which, when executed by a processor, cause the processor to:

read a remote boot signal and a program type signal from a memory of a computer system, the remote boot signal and program type signal written by way of an external channel; and boot a program identified by the program type signal.

8. The method of claim 7 in which the sequences of instructions, when executed by the processor, further cause the processor to:

boot the program when the remote boot signal has a predetermined value.

9. The article of claim 7 in which the sequences of instructions, when executed by the processor, further cause the processor to:

locate a hard disk comprising the program.

10. The article of claim 9 in which the sequences of instructions, when executed by the processor, further cause the processor to:

locate a partition on the hard disk comprising the program.

11. The article of claim 9 in which the sequences of instructions, when executed by the processor, further cause the processor to:

identify the hard disk as a default disk.

12. The article of claim 10 in which the sequences of instructions, when executed by the processor, further cause the processor to:

identify the partition as an active partition of the hard disk.

13. A computer system comprising:

a processor;

a bus; and a machine-readable medium to supply instructions to the processor by way of the bus, the machine-readable medium having stored thereon sequences of instructions which, when executed by the processor, cause the processor to:

read a remote boot signal and a program type signal from a memory of a computer system, the remote boot signal and program type signal written by way of an external channel; and boot a program identified by the program type signal.

14. The method of claim 13 in which the sequences of instructions, when executed by the processor, further cause the processor to:

boot the program when the remote boot signal has a predetermined value.

15. The computer system of claim 13 in which the sequences of instructions, when executed by the processor, further cause the processor to:

locate a hard disk comprising the program.

16. The computer system of claim 15 in which the sequences of instructions, when executed by the processor, further cause the processor to:

locate a partition on the hard disk comprising the program.

17. The computer system of claim 15 in which the sequences of instructions, when executed by the processor, further cause the processor to:

identify the hard disk as a default disk.

18. The computer system of claim 16 in which the sequences of instructions, when executed by the processor, further cause the processor to:

identify the partition as an active partition of the hard disk.

* * * * *

UNITED STATES PATENT AND TRADEMARK OFFICE
CERTIFICATE OF CORRECTION

PATENT NO. : 6,550,006 B1
DATED : April 15, 2003
INVENTOR(S) : Khanna

It is certified that error appears in the above-identified patent and that said Letters Patent is hereby corrected as shown below:

<u>Column 2,</u>
Line 1, after "diagnostic", delete "to".
Line 30, delete "modem", insert -- modern --.

Signed and Sealed this

Sixteenth Day of September, 2003

JAMES E. ROGAN
*Director of the United States Patent and Trademark Office*